(12) United States Patent
Kim

(10) Patent No.: US 11,390,235 B2
(45) Date of Patent: Jul. 19, 2022

(54) SEAT-MOUNTED AIR BAG DEVICE

(71) Applicants: HYUNDAI MOTOR COMPANY, Seoul (KR); KIA MOTORS CORPORATION, Seoul (KR)

(72) Inventor: Sung Hoon Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/164,024

(22) Filed: Feb. 1, 2021

(65) Prior Publication Data
US 2022/0111813 A1 Apr. 14, 2022

(30) Foreign Application Priority Data
Oct. 13, 2020 (KR) .................. 10-2020-0132096

(51) Int. Cl.
| | |
|---|---|
| *B60R 21/207* | (2006.01) |
| *B60R 21/237* | (2006.01) |
| *B60R 21/235* | (2006.01) |
| *B60R 21/2338* | (2011.01) |
| *B60R 21/233* | (2006.01) |
| *B60R 21/231* | (2011.01) |

(52) U.S. Cl.
CPC ......... *B60R 21/207* (2013.01); *B60R 21/233* (2013.01); *B60R 21/235* (2013.01); *B60R 21/237* (2013.01); *B60R 21/2338* (2013.01); *B60R 2021/23107* (2013.01); *B60R 2021/23386* (2013.01); *B60R 2021/23509* (2013.01); *B60R 2021/23576* (2013.01)

(58) Field of Classification Search
CPC ............... B60R 21/207; B60R 21/233; B60R 21/2338; B60R 21/235; B60R 21/237; B60R 2021/161; B60R 2021/23107; B60R 2021/23146; B60R 2021/23161; B60R 2021/23308; B60R 2021/23386; B60R 2021/23509; B60R 2021/23576
See application file for complete search history.

(56) References Cited

U.S. PATENT DOCUMENTS

| 3,795,412 A | * | 3/1974 | John ..................... B60R 21/232 |
| | | | 280/730.1 |
| 3,981,520 A | * | 9/1976 | Pulling ................ B60N 2/4221 |
| | | | 280/730.2 |

(Continued)

FOREIGN PATENT DOCUMENTS

| FR | 2927592 A1 * | 8/2009 | .......... B60R 21/207 |
| JP | 2018-171993 A | 11/2018 | |

(Continued)

*Primary Examiner* — Laura Freedman
(74) *Attorney, Agent, or Firm* — McDonnell Boehnen Hulbert & Berghoff LLP

(57) ABSTRACT

An air bag device in which due to coupling between airbag chambers, a passenger is directly restrained in a seat located at each of various positions such that the air bag device responds to various collision modes. The air bag device includes a bridge chamber unfolding in a shape covering a first side of a seat and a front thereof, and a hook chamber unfolding in a shape covering a second side of the seat and the front thereof and coupled to the bridge chamber by a first coupling device in a part overlapping with the bridge chamber.

13 Claims, 9 Drawing Sheets

(56) References Cited

U.S. PATENT DOCUMENTS

| | | | |
|---|---|---|---|
| 5,575,497 A * | 11/1996 | Suyama | B60R 21/231 |
| | | | 280/730.1 |
| 6,315,245 B1 * | 11/2001 | Ruff | B64D 25/02 |
| | | | 244/122 AG |
| 8,740,244 B2 | 6/2014 | Obadia | |
| 9,744,932 B1 | 8/2017 | Faruque et al. | |
| 9,862,347 B2 * | 1/2018 | Deng | B60R 21/235 |
| 9,981,624 B2 * | 5/2018 | Perlo | B60R 21/207 |
| 9,994,181 B1 * | 6/2018 | Dubaisi | B60R 21/207 |
| 10,112,570 B2 * | 10/2018 | Barbat | B60N 2/143 |
| 10,246,043 B2 * | 4/2019 | Schneider | B60R 21/207 |
| 10,336,283 B2 * | 7/2019 | Rickenbach | B60R 21/233 |
| 10,513,206 B2 * | 12/2019 | Spahn | B60N 2/4207 |
| 10,556,563 B2 * | 2/2020 | Song | B60R 21/2338 |
| 10,569,732 B2 * | 2/2020 | Nagasawa | B60R 21/207 |
| 10,730,470 B2 * | 8/2020 | Choi | B60R 21/214 |
| 10,759,376 B2 * | 9/2020 | Jindal | B60R 21/2338 |
| 10,800,368 B2 * | 10/2020 | Kitagawa | B60R 21/207 |
| 10,850,699 B2 * | 12/2020 | Dry | B60R 21/231 |
| 10,870,405 B2 * | 12/2020 | Kwon | B60R 21/23138 |
| 10,906,495 B2 * | 2/2021 | Nagasawa | B60R 21/0132 |
| 10,933,836 B2 * | 3/2021 | Yoo | B60N 2/79 |
| 11,052,861 B2 * | 7/2021 | Park | B60R 21/207 |
| 11,084,449 B2 * | 8/2021 | Nagasawa | B60R 21/207 |
| 11,214,226 B2 * | 1/2022 | Nagasawa | B60R 21/2334 |
| 2017/0225641 A1 | 8/2017 | Faruque et al. | |
| 2017/0247006 A1 | 8/2017 | Rao et al. | |
| 2017/0259772 A1 | 9/2017 | Farooq et al. | |
| 2017/0259774 A1 | 9/2017 | Matsushita et al. | |
| 2019/0077359 A1 * | 3/2019 | Kim | B60R 21/233 |
| 2020/0317154 A1 * | 10/2020 | Choi | B60R 21/231 |
| 2021/0170983 A1 * | 6/2021 | Shin | B60R 21/207 |
| 2021/0354653 A1 * | 11/2021 | Lee | B60R 21/2338 |
| 2021/0354654 A1 * | 11/2021 | Lee | B60R 21/261 |
| 2021/0362670 A1 * | 11/2021 | Hwangbo | B60R 21/233 |
| 2021/0402949 A1 * | 12/2021 | Sung | B60R 21/23138 |

FOREIGN PATENT DOCUMENTS

| | | |
|---|---|---|
| JP | 2019-034674 A | 3/2019 |
| JP | 2019034675 A * | 3/2019 |
| JP | 2019-177791 A | 10/2019 |
| KR | 2019-0028588 A | 3/2019 |

* cited by examiner

SEAT-MOUNTED AIR BAG DEVICE

CROSS REFERENCE TO RELATED APPLICATIONS

The present application claims priority to Korean Patent Application No. 10-2020-0132096, filed Oct. 13, 2020, the entire contents of which is incorporated herein for all purposes by this reference.

BACKGROUND

A. Field

The present disclosure relates to an air bag device, in which due to coupling between airbag chambers, a passenger is directly restrained in a seat located at each of various positions such that the air bag device responds to various collision modes.

B. Description of the Related Art

As the position and function of a seat in a fully autonomous vehicle is diversified, it is necessary to respond to collisions occurring in various situations.

Accordingly, the size of an airbag is required to be increased, but due to a slimmed cockpit, space for installing the airbag is becoming narrower, making it difficult to increase the size of the airbag.

Meanwhile, airbags having various concepts are being developed to safely restrain passengers in various seat positions.

However, the existing airbags cannot directly restrain passengers, and thus have difficulty in coping with various collision modes Accordingly, in order to cope with the various collision modes, it may be considered that the number of airbags is increased or seatbelts are applied. However, in a situation in which space for additionally mounting such a restraint device is increasingly insufficient, the practical application of the restraint device may be difficult.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose an air bag device, in which due to coupling between airbag chambers, a passenger is directly restrained in a seat located at each of various positions such that the air bag device responds to various collision modes.

In order to achieve the above objective, according to one aspect of the present disclosure, there is provided an air bag device including a bridge chamber unfolding in a shape covering a first side of a seat and a front thereof, and a hook chamber unfolding in a shape covering a second side of the seat and the front thereof and coupled to the bridge chamber by a first coupling means in a part overlapping with the bridge chamber.

The bridge chamber may include a bridge side part fixed to and covering the first side of the seat, and a bridge front part bending from a front end of the bridge side part toward the front of the seat. The hook chamber may include a hook side part fixed to and covering the second side of the seat, and a hook front part bending from a front end of the hook side part toward the front of the seat and overlapping with the bridge front part at a rear of the bridge front part.

The first coupling means may include a first hook coupled to the hook front part, and a first bridge coupled to the bridge front part, wherein in a process in which the hook chamber and the bridge chamber are unfolded outward, the first hook may be hooked and coupled to the first bridge.

The first hook may include a fixing plate fixed on a front surface of the hook front part, the fixing plate being formed to have a shape of a strip in a vertical and longitudinal direction thereof, and a hook part formed in the fixing plate toward the hook side part, wherein an outer surface of the hook part continuing from the fixing plate to the hook part may be formed to have a shape of a curved surface. The first bridge may include leg parts provided at opposite sides thereof and fixed to upper and lower parts of a rear surface of the bridge front part, respectively, and a holding part connected between the leg parts such that the holding part is spaced apart from the rear surface of the bridge front part, so the hook part may be hooked and coupled to the holding part.

The first bridge may be made of a material having at least a predetermined elasticity, and the first bridge and the first hook may be wrapped with fabrics made of the same material as a material of the chambers and be sewn to the bridge front part and the hook front part, respectively.

A bridge connection part may be connected between the bridge side part and the bridge front part, wherein an outer edge of the bridge connection part may be configured to be longer than an inner edge of the bridge connection part.

A hook connection part may be connected between the hook side part and the hook front part, wherein an outer edge of the hook connection part may be configured to be longer than an inner edge of the hook connection part.

A bridge tether may be connected at a first end thereof to an inner surface of the bridge side part, and a second end of the bridge tether may be connected to a rear surface of the bridge front part.

Each of the bridge side part and the hook side part may be folded in a zigzag shape, and each of the bridge front part and the hook front part may be folded in a roll shape.

The bridge chamber and the hook chamber may be unfolded within a height between a seat cushion and a headrest.

The air bag device may further include a roof chamber unfolded in a shape covering an upper part of the seat and the first side thereof and coupled to the bridge chamber by a second coupling means at a part overlapping with the bridge chamber.

The roof chamber may include a roof upper part covering the upper part of the seat, and a roof side part bending from a side end of the roof upper part toward a side part of the seat.

An end part of the roof chamber may communicate with an upper end of the hook side part, so the roof chamber may be unfolded by gas injected into the hook chamber.

The second coupling means may include a second hook coupled to the roof side part, and a second bridge coupled to the bridge side part, wherein in a process in which the roof upper part moves upward, the second hook may be hooked and coupled to the second bridge.

A roof tether may be connected at a first end thereof to an inner surface of the hook side part, and a second end of the roof tether may be connected to a lower surface of the roof upper part.

The bridge chamber may be configured to be unfolded earlier than the hook chamber, and in a process in which the hook chamber is moved toward the bridge chamber as a load of a passenger is applied to the hook chamber during the unfolding of each of the bridge chamber and the hook chamber, the hook chamber may be coupled to the bridge chamber by the first coupling means.

According to the present disclosure having the above-described problem solving means, while the bridge chamber and the hook chamber are unfolded in a shape of covering the opposite sides of a passenger, the bridge chamber and the hook chamber are directly coupled to each other in front of the passenger, so an airbag cushion entirely surrounds the opposite sides and front of the passenger sitting on the seat. Accordingly, the air bag device of the present disclosure directly restrains the passenger in the seat located at each of various positions and for postures of the passenger, thereby coping with various collision modes and safely protecting the passenger.

In addition, while the roof chamber is unfolded in the shape of covering the upper part of a passenger, the roof chamber is coupled to the bridge chamber at the side part of the passenger, so the airbag cushion covers the upper part of the passenger sitting on the seat.

Accordingly, when a passenger sitting on a seat moves upward during vehicle rollover, the roof chamber is coupled to the bridge chamber, so that the roof chamber restrains the passenger while protecting the passenger's head, thereby protecting the passenger.

BRIEF DESCRIPTION OF THE FIGURES

The above and other objectives, features, and other advantages of the present disclosure will be more clearly understood from the following detailed description when taken in conjunction with the accompanying drawings, in which.

DETAILED DESCRIPTION

Hereinbelow, exemplary embodiments of the present disclosure will be described in detail with reference to the accompanying drawings.

Figure 1:
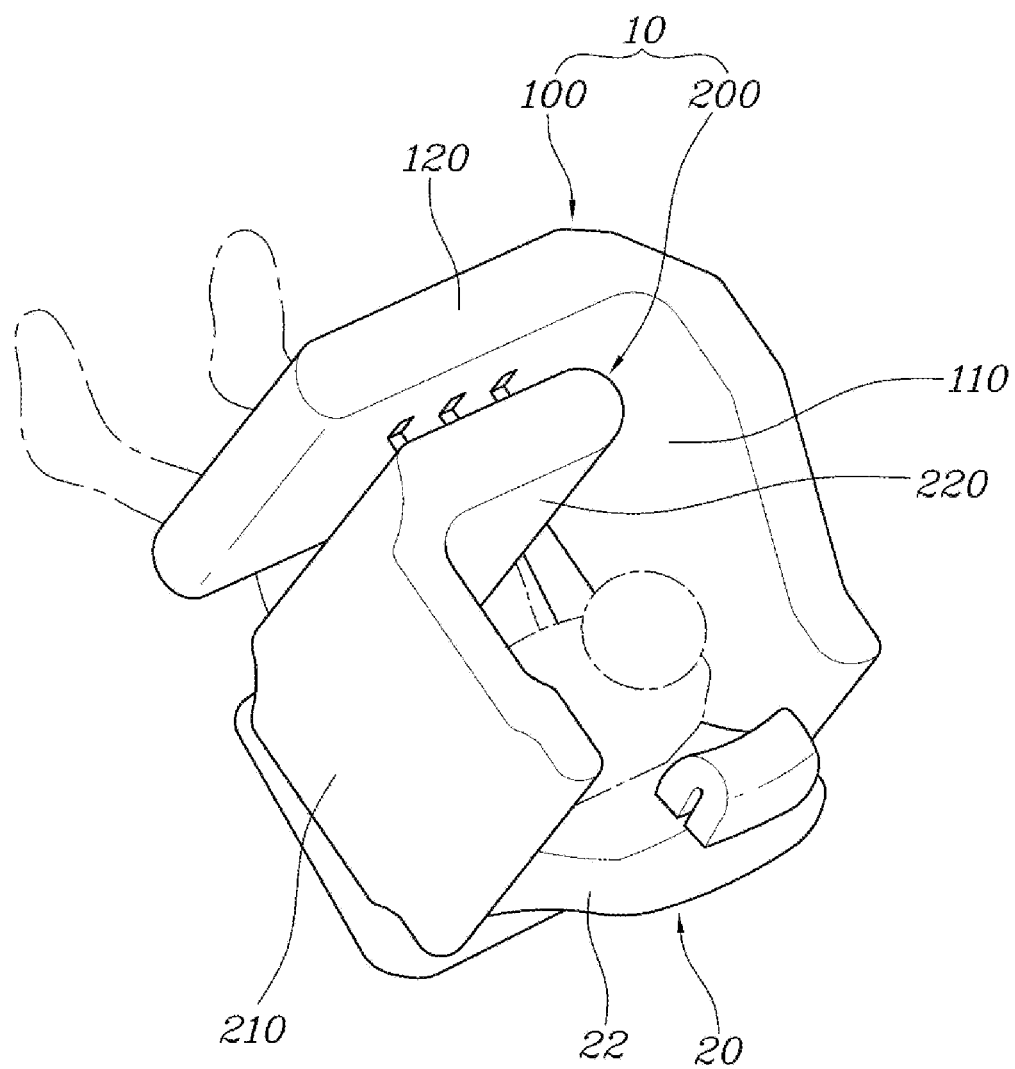
FIG. 1 is a view illustrating the unfolded shape of an air bag device according to the first embodiment of the present disclosure.

FIG. 1 is a view illustrating the unfolded shape of an air bag device according to the first embodiment of the present disclosure.

Referring to the drawing, the air bag device of the present disclosure includes a bridge chamber 100 unfolding in a shape covering a first side of a seat 20 and a front thereof, and a hook chamber 200 unfolding in a shape covering a second side of the seat 20 and a front thereof and coupled to the bridge chamber 100 by a first coupling means in a part overlapping with the bridge chamber 100.

For example, with a first end of the bridge chamber 100 fixed to a first side of a seatback 22, the bridge chamber 100 is unfolded forward, and with a first end of the hook chamber 200 fixed to a second side of the seatback 22, the hook chamber 200 is unfolded forward.

In addition, the bridge chamber 100 and the hook chamber 200 are unfolded with a second end of the bridge chamber 100 and a second end of the hook chamber 200 overlapping with each other in the front of the seat 20, that is, in front of a passenger sitting on the seat 20. In this state, the bridge chamber 100 and the hook chamber 200 are coupled to each other by the first coupling means.

Furthermore, the bridge chamber 100 and the hook chamber 200 may be unfolded within height between the seat cushion 24 and a headrest 26.

That is, while the bridge chamber 100 and the hook chamber 200 are unfolded in a shape covering the opposite sides of a passenger, the bridge chamber 100 and the hook chamber 200 are directly coupled to each other in front of the passenger, so an airbag cushion 10 including each of the chambers entirely surrounds the opposite sides and front of the passenger sitting on the seat 20.

Accordingly, the air bag device directly restrains a passenger in the seat 20 located at each of various positions and for postures of the passenger, thereby coping with various collision modes and safely protecting the passenger. Furthermore, the air bag device can replace a seatbelt as well as airbags located in other parts, greatly improving marketability.

Additionally, the bridge chamber 100 includes a bridge side part 110 and a bridge front part 120, and the hook chamber 200 includes a hook side part 210 and a hook front part 220.

The structures of the bridge chamber 100 and the hook chamber 200 will be described more in detail with reference to the drawing. The bridge chamber includes the bridge side part 110 fixed to and covering the first side of the seat 20, and the bridge front part 120 bending from the front end of the bridge side part 110 toward the front of the seat 20.

In addition, the hook chamber 200 includes the hook side part 210 fixed to and covering the second side of the seat 20, and the hook front part 220 bending from the front end of the hook side part 210 toward the front of the seat 20 and overlapping with the bridge front part 120 at the rear of the bridge front part 120.

For example, the rear end of the bridge side part 110 is fixed to the first side of a seatback frame provided inside the seatback 22, and the front end of the bridge side part 110 is unfolded forward, so that the bridge side part 110 covers the first side of the seat 20.

In addition, the front end of the bridge front part 120 continues to the first end of the bridge side part 110, and the second end of the bridge side part 110 is unfolded perpendicularly to the bridge side part 110 toward the second side of the seat 20, so the bridge chamber 100 is unfolded in an L shape.

Furthermore, the rear end of the hook side part 210 is fixed to the second side of the seatback frame provided inside the seatback 22, and the front end of the hook side part 210 is unfolded forward, so that the hook side part 210 covers the second side of the seat 20.

Additionally, the front end of the hook front part 220 continues to the first end of the hook side part 210, and the second end of the hook side part 210 is unfolded perpendicularly to the hook side part 210 toward the first side of the seat 20, so the hook chamber 200 is unfolded in an L shape.

Particularly, the hook chamber 200 is unfolded in the shape in which the hook front part 220 overlaps with the bridge front part 120 at the rear of the bridge front part 120. To this end, the front-to-rear length of the bridge side part 110 is longer than the front-to-rear length of the hook side part 210.

In addition, the bridge chamber 100 may be unfolded earlier than the hook chamber 200. This may be implemented by controlling the ignition point of an inflator injecting gas into the bridge chamber 100 and the hook chamber 200.

Accordingly, in a process in which the front end part of the hook chamber 200 is moved toward the front end part of the bridge chamber 100 as the load of the body of a passenger sitting on the seat 20 is applied to the hook chamber 200 during the unfolding of each of the bridge chamber 100 and the hook chamber 200, the hook chamber is coupled to the bridge chamber 100 by the first coupling means.

Figure 2:
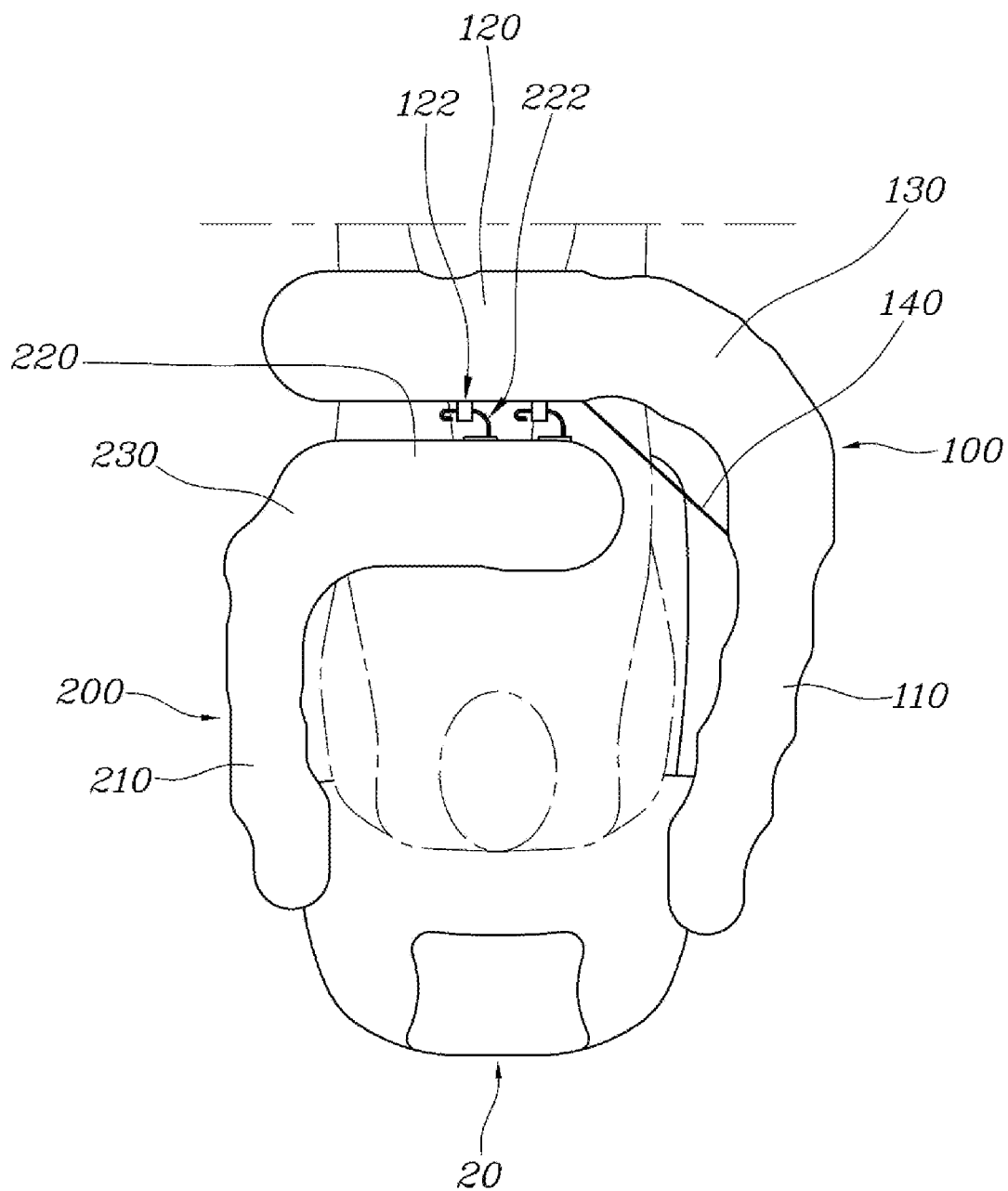
FIG. 2 is a view illustrating a relation in which a bridge chamber and a hook chamber are coupled to each other by a first coupling means in FIG. 1.

FIG. 2 is a view illustrating a relation in which the bridge chamber 100 and the hook chamber 200 are coupled to each other by the first coupling means in FIG. 1.

Referring to the drawing, the first coupling means includes a first hook 222 coupled to the hook front part 220, and a first bridge 122 coupled to the bridge front part 120. In a process in which the hook chamber 200 and the bridge chamber 100 are unfolded outward, the first hook 222 is hooked and coupled to the first bridge 122.

For example, the first hook 222 and the first bridge 122 may be provided on the hook front part 220 and the bridge front part 120, respectively, at positions therebetween.

Accordingly, when the load of the body of a passenger sitting on the seat 20 is applied to the hook front part 220 in a case in which the bridge chamber 100 and the hook chamber 200 are unfolded during collision of a vehicle, the hook front part 220 is moved toward the outside of the seat 20 while pushing the bridge front part 120 located in the front of the hook front part toward the front of the seat 20. In this case, the first hook 222 is hooked and coupled to the first bridge 122 coupled to the bridge front part 120.

Figure 3:
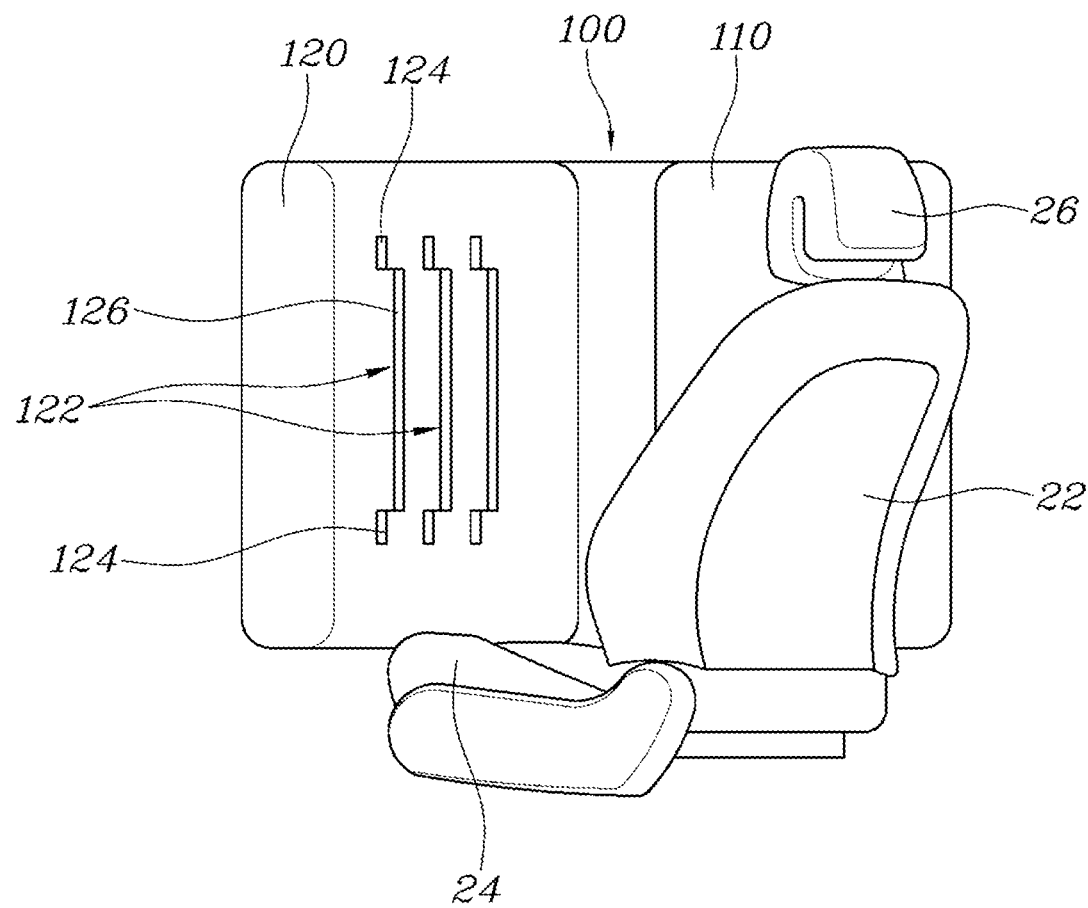
FIG. 3 is a view illustrating a shape in which a first bridge is coupled to the inner side of the bridge chamber of FIG. 1.
Figure 4:
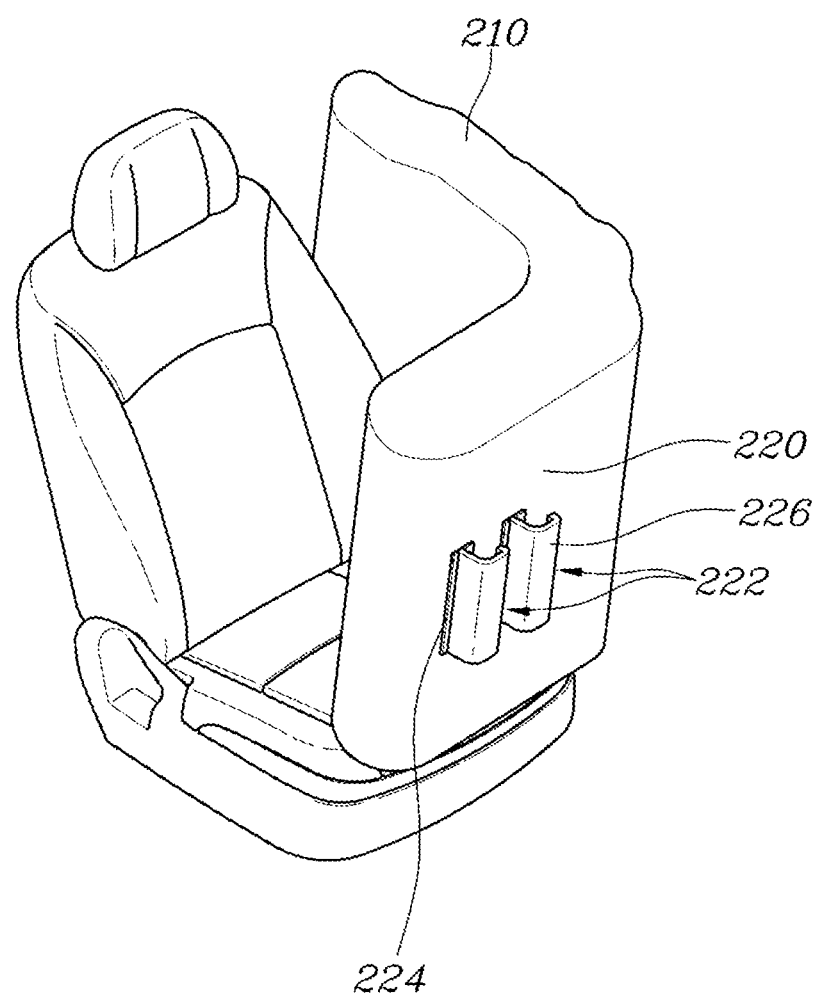
FIG. 4 is a view illustrating a shape in which a first hook is coupled to the outer side of the hook chamber of FIG. 1.

FIG. 3 is a view illustrating a shape in which the first bridge 122 is coupled to the inner side of the bridge chamber 100 of FIG. 1, and FIG. 4 is a view illustrating a shape in which the first hook 222 is coupled to the outer side of the hook chamber of FIG. 1. Hereinafter, the configurations of the first hook 222 and the first bridge 122 will be described more in detail.

First, the first hook 222 includes a fixing plate 224 fixed on the front surface of the hook front part 220, the fixing plate being formed to have a shape of a rectangular strip in a vertical and longitudinal direction thereof, and a hook part 226 formed in the fixing plate 224 toward the hook side part 210. An outer surface of the hook part continuing from the fixing plate 224 to the hook part 226 has a curved surface.

In addition, the first bridge 122 includes a leg part 124 of each of opposite sides thereof fixed to each of the upper and lower parts of the rear surface of the bridge front part 120, and a holding part 126 connected between the leg parts 124 with the holding part spaced apart from the rear surface of the bridge front part 120, so the hook part 226 is hooked and coupled to the holding part 126.

For example, the fixing plate 224 of the first hook 222 is sewn on the front surface of the hook front part 220 in a vertical direction, and thus the first hook 222 is securely fixed to the hook chamber 200.

The first hook 222 includes at least two first hooks 222 fixed to the hook chamber in a horizontal direction such that the coupling stability of the first hook 222 and the first bridge 122 is secured. Particularly, the first hook 222 has the hook part 226 formed therein to secure the coupling of the first hook 222 and the first bridge 122.

In addition, a predetermined R value is given to the outer surface continuing from the fixing plate 224 to the hook part 226 such that the outer surface has a curved shape In the initial stage of the unfolding of the hook chamber 200 and the bridge chamber 100, the first bridge 122 is prevented from being hooked to the first hook 222 such that the hook chamber 200 is unfolded properly or the unfolding thereof is not delayed.

In addition, the leg part 124 of each of the opposite ends of the first bridge 122 is sewn to each of the upper and lower ends of the rear surface of the bridge front part 120, so the first bridge 122 is securely fixed to the bridge chamber 100.

The first bridge 122 is in the shape of a handle formed to be vertically long, and includes at least two first bridges fixed to the rear surface of the bridge front part 120 in a side-to-side direction, so the coupling stability of the first hook 222 is secured.

In addition, the first bridge 122 is made of a material having at least a predetermined elasticity, and the first bridge 122 and the first hook 222 are wrapped with fabrics made of the same material as materials of the chambers and are sewn to the bridge front part 120 and the hook front part 220, respectively.

For example, the first bridge 122 is made of thermoplastic polyurethane (TPU) (urethane rubber) having excellent elasticity and resilience. Accordingly, the shape of the first bridge 122 folded flat with the bridge chamber 100 prior to the unfolding of the bridge chamber 100 may be rapidly restored to an initial shape of the first bridge, so the first hook 222 may be hooked to the first bridge 122.

Furthermore, the first hook 222 may be formed of a composite plastic material which has a weight smaller than steel and can secure at least a predetermined degree of rigidity.

Particularly, to prevent the damage of the hook chamber 200 and the bridge chamber 100 to which the first hook 222 and the first bridge 122, respectively, are sewn, the first hook 222 and the first bridge 122 are sewn to the hook chamber 200 and the bridge chamber 100, respectively, after the first hook 222 and the first bridge 122 are wrapped with fabrics made of the same materials as the materials of the chambers.

Meanwhile, referring to FIG. 2, a bridge connection part 130 is connected between the bridge side part 110 and the bridge front part 120, wherein an outer edge of the bridge connection part 130 is configured to be longer than an inner edge of the bridge connection part 130.

That is, gas injected into the bridge chamber 100 is supplied to the bridge front part 120 from the bridge side part 110. Accordingly, the outer edge of the bridge connection part 130 is configured to be longer than the inner edge of the bridge connection part 130 such that the bridge chamber 100 is unfolded while the flow of gas naturally turns from the bridge side part 110 to the bridge front part 120.

In addition, a hook connection part 230 may be connected between the hook side part 210 and the hook front part 220, wherein an outer edge of the hook connection part 230 may be longer than an inner edge of the hook connection part 230.

That is, gas injected into the hook chamber 200 is supplied to the hook front part 220 from the hook side part 210. Accordingly, for the same reason as the bridge chamber 100 described above, the outer edge of the hook connection part 230 is longer than the inner edge of the hook connection part 230 such that the hook chamber 200 is unfolded while the flow of gas naturally turns from the hook side part 210 to the hook front part 220.

Next, referring to FIG. 2, the first end of a bridge tether 140 may be connected to the inner surface of the bridge side part 110, and the second end of the bridge tether 140 may be connected to the rear surface of the bridge front part 120.

That is, the tether is applied to the bridge chamber 100, so during the unfolding of the bridge chamber 100, the rotation amount of the bridge front part 120 rotating outward is minimized.

Accordingly, the bridge front part 120 does not move away from the hook front part 220, so the coupling stability of the first bridge 122 and the first hook 222 is secured.

Figure 5:
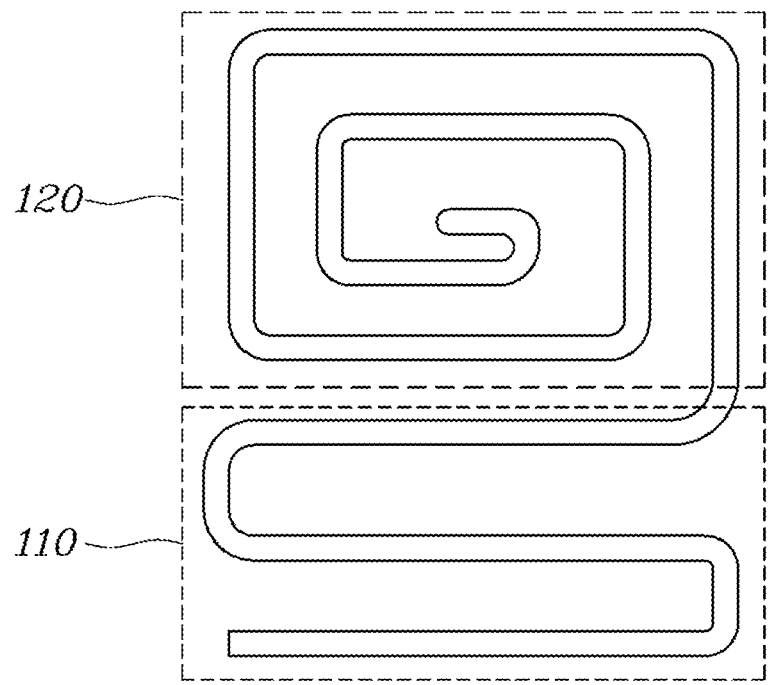
FIG. 5 is a view illustrating the folding structure of the bridge chamber according to the present disclosure.
Figure 6:
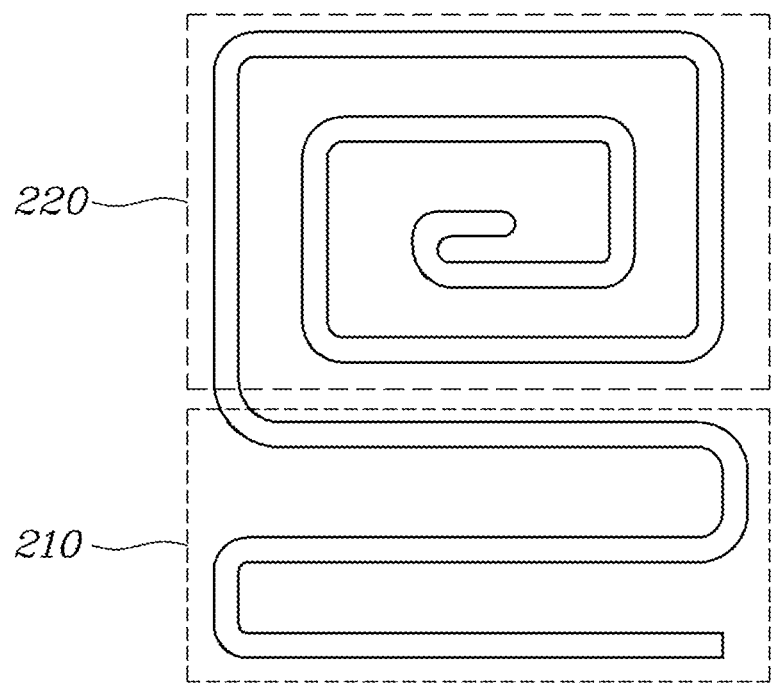
FIG. 6 is a view illustrating the folding structure of the hook chamber according to the present disclosure.

Meanwhile, FIG. 5 is a view illustrating the folding structure of the bridge chamber 100 according to the present disclosure, and FIG. 6 is a view illustrating the folding structure of the hook chamber 200 according to the present disclosure.

Referring to the drawing, each of the bridge side part 110 and the hook side part 210 is configured to be folded in a zigzag shape, and each of the bridge front part 120 and the hook front part 220 is configured to be folded in a roll shape.

That is, the parts folded in a zigzag shape are unfolded earlier than the parts folded in a roll shape, so the bridge side part 110 and the hook side part 210 are unfolded earlier than the bridge front part 120 and the hook front part 220. Accordingly, with the bridge front part 120 and the hook front part 220 prevented from interfering with an upper body part including a passenger's shoulder and arm in the process in which the bridge chamber 100 and the hook chamber 200 are unfolded, the airbag cushion 10 is unfolded.

Figure 7:
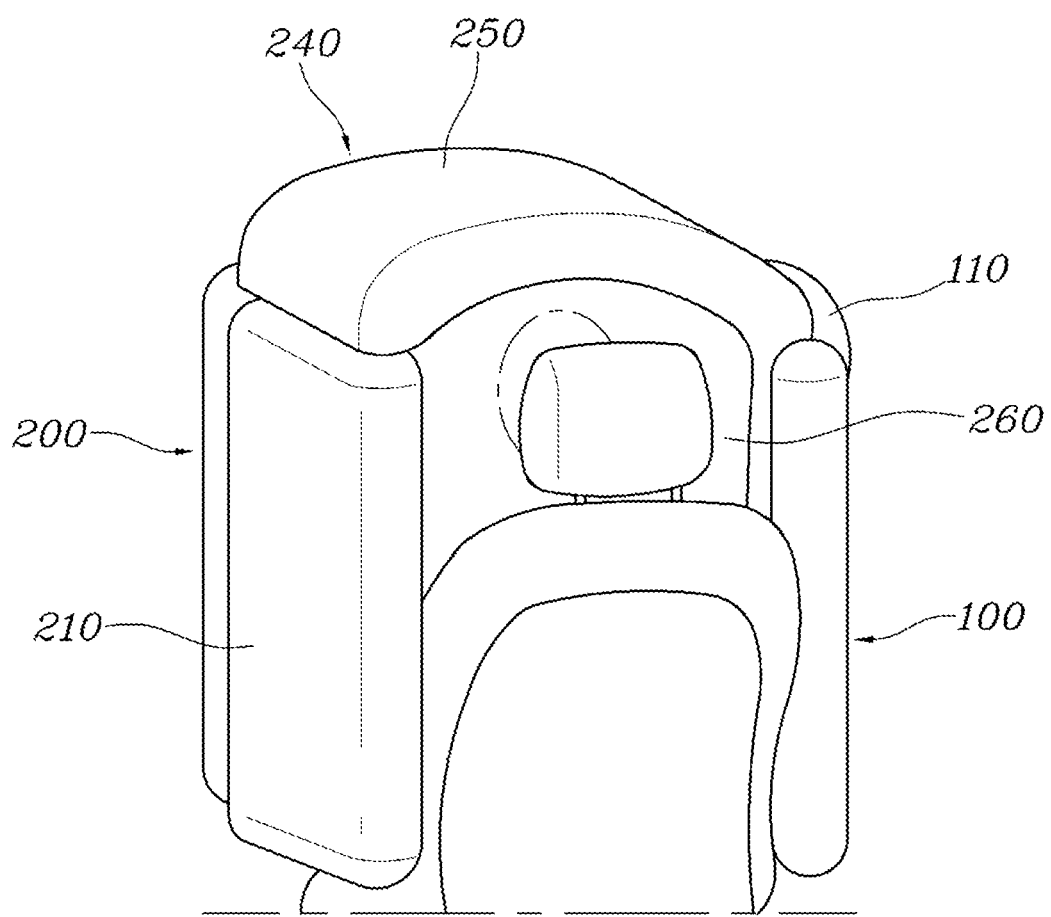
FIG. 7 is a view illustrating the unfolded shape of an air bag device according to the second embodiment of the present disclosure.

Meanwhile, FIG. 7 is a view illustrating the unfolded shape of the air bag device according to the second embodiment of the present disclosure.

Referring to the drawing, the air bag device of the present disclosure is configured by further including a roof chamber 240 unfolded in a shape covering the upper part of the seat 20 and the first side thereof and coupled to the bridge chamber 100 by a second coupling means at a part overlapping with the bridge chamber 100.

For example, the roof chamber 240 is unfolded in the shape of a dome between the upper end of the bridge side part 110 and the upper end of the hook side part 210, and in the shape in which the roof chamber 240 and the bridge chamber 100 overlap with each other. In this state, the roof chamber 240 and the bridge chamber 100 are coupled to each other by the second coupling means.

That is, while the roof chamber 240 is unfolded in the shape of covering the upper part of a passenger, the roof chamber 240 and the bridge chamber 100 are coupled to each other at the side part of the passenger, so the airbag cushion 10 covers the upper part of the passenger sitting on the seat 20.

Accordingly, when a passenger sitting on the seat 20 moves upward during vehicle rollover, the roof chamber 240 is coupled to the bridge chamber 100, so that the roof chamber 240 restrains the passenger while protecting the passenger's head, thereby protecting the passenger.

In addition, the roof chamber 240 includes a roof upper part 250 covering the upper part of the seat 20, and a roof side part 260 bending from a side end of the roof upper part 250 toward the side part of the seat 20.

In addition, the end part of the roof chamber 240 communicates with the upper end of the hook side part 210, so the roof chamber 240 is unfolded by gas injected into the hook chamber 200.

For example, the first end of the roof upper part 250 is connected to the upper end of the hook side part 210, and the second end of the roof upper part 250 is unfolded toward the bridge side part 110, and thus covers the upper part of the seat 20.

In addition, the second end of the roof upper part 250 continues to the upper end of the roof side part 260, and the upper end of the roof side part 260 is unfolded downward inside the bridge side part 110, so the roof chamber 240 is unfolded in an L shape.

Accordingly, each of the roof side part 260 and the bridge side part 110 is unfolded in a shape of overlapping with each other. In this overlapping portion, the roof side part 260 is coupled to the bridge side part 110 by the second coupling means.

Figure 8:
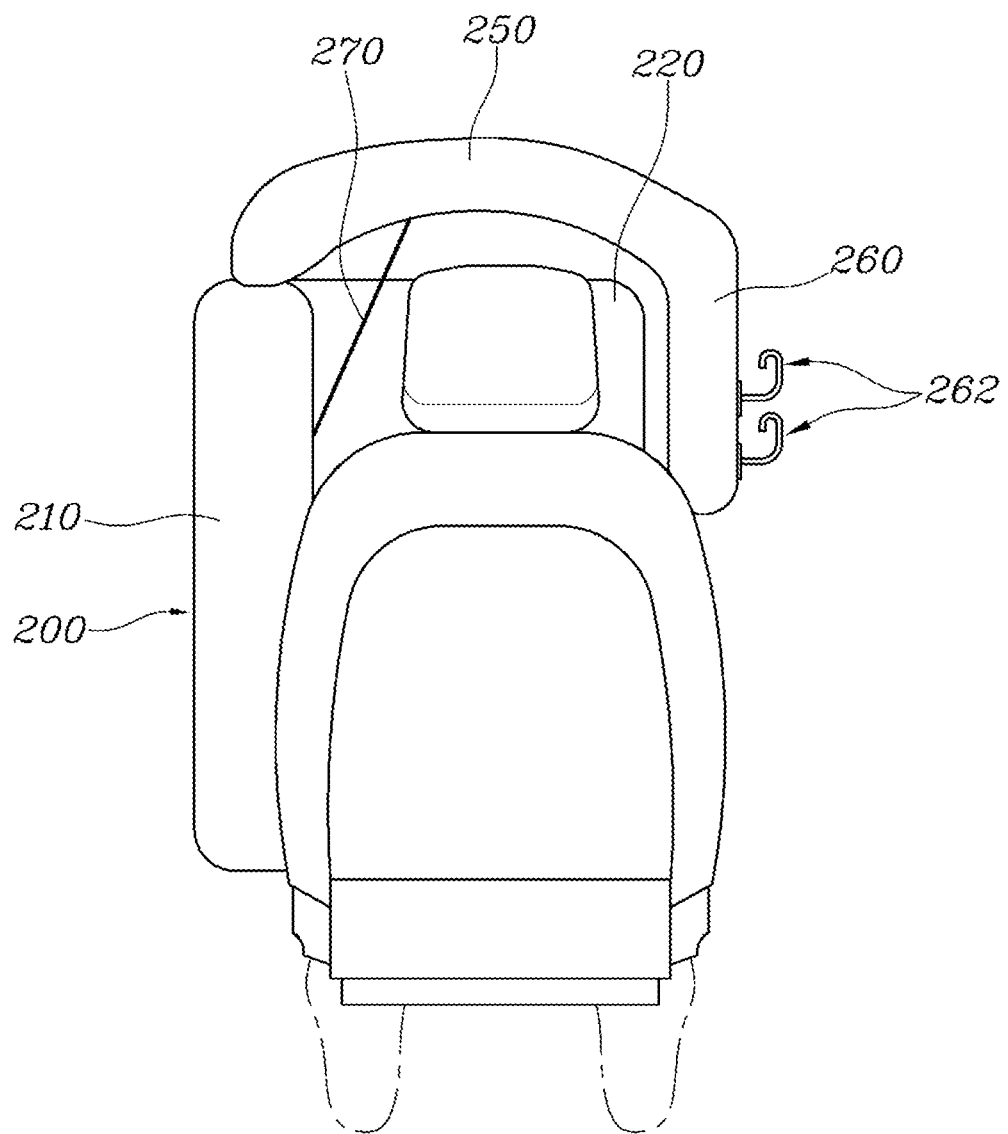
FIG. 8 is a view illustrating a roof tether and a second hook applied to a roof chamber of FIG. 7.
Figure 9:
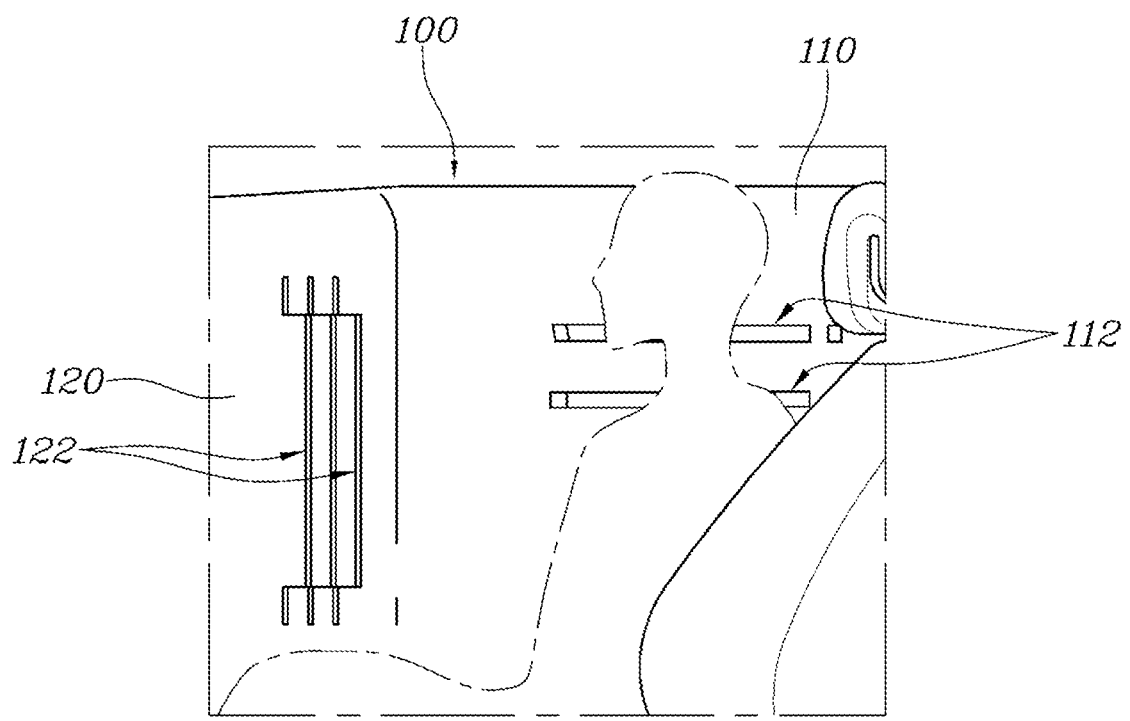
FIG. 9 is a view illustrating a second bridge applied to the bridge chamber of FIG.

Furthermore, FIG. 8 is a view illustrating a roof tether 270 and a second hook 262 applied to the roof chamber 240 of FIG. 7, and FIG. 9 is a view illustrating a second bridge 112 applied to the bridge chamber 100 of FIG. 7.

The configuration of the second coupling means will be described with reference to the drawings. The second coupling means includes the second hook 262 coupled to the roof side part 260, and the second bridge 112 coupled to the bridge side part 110. In the process in which the roof upper part 250 moves upward, the second hook 262 is hooked and coupled to the second bridge 112.

For example, the second hook 262 and the second bridge 112 are provided in the roof side part 260 and the bridge side part 110, respectively, therebetween. The second hooks 262 are coupled to the outer surface of the roof side part 260 in a side-to-side direction, and the second bridge 112 is coupled to the inner surface of the bridge side part 110 in the horizontal direction.

Accordingly, when the load of the head part of a passenger sitting on the seat 20 is applied to the roof upper part 250 during vehicle rollover, the roof upper part 250 and the roof side part 260 are moved together upward. In this process, the second hook 262 coupled to the roof side part 260 is hooked and coupled to the second bridge 112 coupled to the bridge side part 110.

Accordingly, the configuration of each of the second hook 262 and the second bridge 112 and the structure in which the second hook 262 is coupled to the second bridge 112 are substantially the same as the configuration of each of the first hook 222 and the first bridge 122 and the structure in which the first hook 222 is coupled to the first bridge 122 which are described above, differing only in coupling direction.

That is, the second hook 262 and the second bridge 112 have the same shapes as the first hook 222 and the first bridge 122. Even in the structure of the second hook 262 and the second bridge 112 fixed to the chambers, the second hook 262 and the second bridge 112 are sewn in the same structure as the first hook 222 and the first bridge 122, and thus detailed description thereof will be omitted.

However, the second hook 262 includes at least two second hooks sewn on the outer surface of the roof side part 260 in a side-to-side longitudinal direction, and the second bridge 112 includes at least two second bridges sewn on the inner surface of the bridge side part 110 in the side-to-side longitudinal direction, so the second hook 262 is coupled to the second bridge 112 while moving upward.

In addition, the first end of the roof tether 270 may be connected to the inner surface of the hook side part 210, and the second end of the roof tether 270 may be connected to the lower surface of the roof upper part 250.

That is, the tether is applied to the roof chamber 240 and the hook chamber 200 therebetween, whereby during the unfolding of the roof chamber 240, the rotation amount of the roof upper part 250 rotating upward is minimized.

Accordingly, the hook side part 210 is not removed from the bridge side part 110, thereby improving the coupling stability of the second bridge 112 and the second hook 262.

As described above, while the bridge chamber 100 and the hook chamber 200 are unfolded in the shape of covering the opposite sides of a passenger, the bridge chamber 100 and the hook chamber 200 are directly coupled to each other in front of the passenger, so the airbag cushion 10 entirely surrounds the opposite sides and front of the passenger sitting on the seat 20. Accordingly, the air bag device of the present disclosure directly restrains a passenger in the seat 20 located at each of various positions and for postures of the passenger, thereby coping with various collision modes and safely protecting the passenger.

In addition, while the roof chamber 240 is unfolded in the shape of covering the upper part of a passenger, the roof chamber 240 is coupled to the bridge chamber 100 at the side part of the passenger, so the airbag cushion 10 covers the upper part of the passenger sitting on the seat 20. Accordingly, when the passenger sitting on the seat 20 moves upward during vehicle rollover, the roof chamber 240 is coupled to the bridge chamber 100, so that the roof chamber 240 restrains the passenger while protecting the passenger's head, thereby protecting the passenger.

Although the exemplary embodiments of the present disclosure has been described for illustrative purposes, those skilled in the art will appreciate that various modifications, additions and substitutions are possible, without departing from the scope and spirit of the disclosure as disclosed in the accompanying claims.

The invention claimed is:

1. An air bag device comprising:
   a bridge chamber unfolding in a shape covering a first side of a seat and a front of the seat; and
   a hook chamber unfolding in a shape covering a second side of the seat and the front of the seat, the hook chamber being coupled to the bridge chamber by a first coupling device in a part overlapping with the bridge chamber;
   wherein the bridge chamber comprises:
      a bridge side part fixed to and covering the first side of the seat; and
      a bridge front part bending from a front end of the bridge side part toward the front of the seat; and
   the hook chamber comprises:
      a hook side part fixed to and covering the second side of the seat; and
      a hook front part bending from a front end of the hook side part toward the front of the seat and overlapping with the bridge front part at a rear of the bridge front part;
   wherein the first coupling device comprises:
      a first hook coupled to the hook front part; and
      a first bridge coupled to the bridge front part;
   wherein in a process in which the hook chamber and the bridge chamber are unfolded outward, the first hook is hooked and coupled to the first bridge;
   wherein the first hook comprises:
      a fixing plate fixed on a front surface of the hook front part, the fixing plate having a shape of a strip in a vertical and longitudinal direction thereof, and a hook part formed in the fixing plate toward the hook side part, wherein an outer surface of the hook part continuing from the fixing plate to the hook part has a curved surface; and
   the first bridge comprises:
      leg parts provided at opposite sides of the first bridge and fixed to upper and lower parts of a rear surface of the bridge front part, respectively, and a holding part connected between the leg parts such that the holding part is spaced apart from the rear surface of the bridge front part, so the hook part is hooked and coupled to the holding part.

2. The device of claim 1, wherein the first bridge is made of a material having at least a predetermined elasticity; and
   the first bridge and the first hook are wrapped with fabrics made of the same material as a material of the bridge chamber and the hook chamber, and the fabrics are sewn to the bridge front part and the hook front part, respectively.

3. The device of claim 1, wherein a bridge connection part is connected between the bridge side part and the bridge front part, wherein an outer edge of the bridge connection part is configured to be longer than an inner edge of the bridge connection part.

4. The device of claim 1, wherein a hook connection part is connected between the hook side part and the hook front part, wherein an outer edge of the hook connection part is configured to be longer than an inner edge of the hook connection part.

5. The device of claim 1, wherein a first end of a bridge tether is connected to an inner surface of the bridge side part, and a second end of the bridge tether is connected to a rear surface of the bridge front part.

6. The device of claim 1, wherein the bridge chamber and the hook chamber are unfolded within a height between a seat cushion and a headrest.

7. The device of claim 1, further comprising:
   a roof chamber unfolded in a shape covering an upper part of the seat and the first side thereof and coupled to the bridge chamber by a second coupling device at a part overlapping with the bridge chamber.

8. The device of claim 7, wherein the roof chamber comprises:
   a roof upper part covering the upper part of the seat, and
   a roof side part bending from a side end of the roof upper part toward a side part of the seat.

9. The device of claim 8, wherein an end part of the roof chamber communicates with an upper end of the hook side part, so the roof chamber is unfolded by gas injected into the hook chamber.

10. The device of claim 8, wherein the second coupling device comprises:
    a second hook coupled to the roof side part; and
    a second bridge coupled to the bridge side part;
    wherein in a process in which the roof upper part moves upward, the second hook is hooked and coupled to the second bridge.

11. The device of claim 1, wherein the bridge chamber is configured to be unfolded earlier than the hook chamber; and
    in a process in which the hook chamber is moved toward the bridge chamber as a load of a passenger is applied to the hook chamber during the unfolding of each of the bridge chamber and the hook chamber, the hook chamber is coupled to the bridge chamber by the first coupling device.

12. An air bag device comprising:
a bridge chamber unfolding in a shape covering a first side of a seat and a front of the seat; and
a hook chamber unfolding in a shape covering a second side of the seat and the front of the seat, the hook chamber being coupled to the bridge chamber by a first coupling device in a part overlapping with the bridge chamber;
wherein the bridge chamber comprises:
    a bridge side part fixed to and covering the first side of the seat; and
    a bridge front part bending from a front end of the bridge side part toward the front of the seat; and
the hook chamber comprises:
    a hook side part fixed to and covering the second side of the seat; and
    a hook front part bending from a front end of the hook side part toward the front of the seat and overlapping with the bridge front part at a rear of the bridge front part; and
wherein each of the bridge side part and the hook side part is folded in a zigzag shape, and each of the bridge front part and the hook front part is folded in a roll shape.

13. An air bag device comprising:
a bridge chamber unfolding in a shape covering a first side of a seat and a front of the seat; and
a hook chamber unfolding in a shape covering a second side of the seat and the front of the seat, the hook chamber being coupled to the bridge chamber by a first coupling device in a part overlapping with the bridge chamber;
wherein the bridge chamber comprises:
    a bridge side part fixed to and covering the first side of the seat; and
    a bridge front part bending from a front end of the bridge side part toward the front of the seat; and
the hook chamber comprises:
    a hook side part fixed to and covering the second side of the seat; and
    a hook front part bending from a front end of the hook side part toward the front of the seat and overlapping with the bridge front part at a rear of the bridge front part; and
a roof chamber unfolded in a shape covering an upper part of the seat and the first side thereof and coupled to the bridge chamber by a second coupling device at a part overlapping with the bridge chamber;
wherein the roof chamber comprises:
    a roof upper part covering the upper part of the seat; and
    a roof side part bending from a side end of the roof upper part toward a side part of the seat; and
wherein a first end of a roof tether is connected to an inner surface of the hook side part, and a second end of the roof tether is connected to a lower surface of the roof upper part.

\* \* \* \* \*